United States Patent Office 3,476,848
Patented Nov. 4, 1969

3,476,848
PROCESS FOR FORMING BOARD STRUCTURES
Herbert F. Schroeder, South Plainfield, N.J., assignor to Esso Research and Engineering Company, a corporation of Delaware
No Drawing. Filed May 22, 1967, Ser. No. 640,402
Int. Cl. B29c 3/00
U.S. Cl. 264—120                    13 Claims

ABSTRACT OF THE DISCLOSURE

A process for forming structural boards from lignocellulose fibers coated with a thermosetting resin binder initially formed into a felted mat. A first stage short duration hot compaction of the mat achieves resin curing at the surfaces only. Compacting pressure is then reduced and the mat allowed to expand to a greater thickness. Under a second hot compaction, the expanded mat is held to a desired thickness while curing the resin within the mat interior to form the final board.

---

Large quantities of lignocellulosic materials are used annually for the production of structural boards of the types used for both interior and exterior applications. Bagasse, for example, is an important lignocellulosic material for such applications and there are yet many potential uses for new and improved structural boards of this material. Bagasse, the crushed residue of the sugar cane stalk, consists principally of fibrous components and parenchyma, generally and hereinafter referred to as pith. The pith is a nonorganized, nonfibrous, pulpy substance from which the juice has been extracted. The fibrous components include the rind fiber and the fibro-vascular fiber bundles or cells. The fibrous components, especially the fibro-vascular fiber bundles or shives, are united or bonded together with pith, though some of the pith is found in the bagasse in loose powder form.

Until recently, the pith, which constitutes a major proportion of the bagasse, was considered waste. This was due to its chemical nature, light cellular structure and high surface area, relative to its mass, which make it a highly reactive and absorbent material of limited commercial utility. It was separated from the fibrous materials to the extent possible, and then discarded. This was considered necessary to provide a raw material suitable for the formation of structural boards or finished products of optimum structure and quality—viz, optimum for machine operation, product quality and low chemical cost per ton of pulp produced. In the separation, large quantities of the fibro-vascular fiber were also unavoidably removed and lost along with the pith.

In a typical application pith is extracted and separated from the whole bagasse by known chemical or mechanical means, preferably the latter, and admixed or sprayed with the desired amount of thermosetting resin, or resins, in dispersion or solution. The pith-resin composition is then deliquefied to form a moist powder. The moist powder is then applied upon or spread over the surfaces of a core structure, or applied as completely as possible to the outer surfaces in the formation of mats, and then pressed and cured to form tenacious high quality surfaces.

The surface qualities which can be developed from bagasse can be varied to some extent, depending upon the nature of the materials and processing or extent of preparation of the materials. One extreme is represented by the surface qualities that can be developed from the fibrous materials remaining after separation of the pith, i.e., the conventional reject fraction of the bagasse. Thus, after removal of the pith, relatively coarse fibers are left behind. On the one hand (the coarse fibers can be formed into a mat and processed into a board of homogeneous structure, the surface quality of which is rather coarse. On the other hand, a portion of the coarse fibers can be further ground and this relatively fine fiber reapplied upon the coarse fiber as a surface layer. The surface of the structure can be sanded, buffed, and then sealed, to provide a surface sufficiently smooth for some commercial applications. The surface quality is nonetheless deficient in many respects and leaves much to be desired. Moreover, to provide even relatively smooth surfaces requires considerable processing steps which, inter alia, adds to the cost of the finished products. At the other extreme, hard, smooth surfaces can be developed from pith-resin faces, these often requiring little or no further processing. However, even these high quality surfaces are capable of improvement, especially where low to medium density structural boards are to be formed.

In the formation of structural boards from lignocellulosic materials such as bagasse, the fibrous materials are thus impregnated, or coated, with thermosetting resins and formed or felted into mats. The mat is then pressed between rigid members to predetermined shape and heated to cure the resin. A mat is thus compressed or compacted between members or platens of a hot press to a desired thickness, and the shape and thickness are retained by the finished board structure.

In high density products, i.e., hard-board, there is usually sufficient back-pressure developed in the mat during the hot-pressing and compression step to allow adequate surface compaction and relatively smooth, hard surfaces are usually obtained. In some medium density products, i.e., boards ranging from about 36 to about 45 pounds per cubic foot such as particle board, and in virtually all low density products, e.g., boards ranging from about 18 to about 36 pounds per cubic foot such as acoustic tile, insulating board and door core, conventional pressing techniques do not permit sufficient back-pressure to be developed. Consequently, the outer layers of fiber as not adequately compacted and a loose, soft face is produced. To provide any facsimile of a smooth face, the finished board must be further processed, e.g., by sanding and buffing. This, of course, complicates the process and adds to cost. And, the face produced may yet be lacking in smoothness to a considerable degree.

Accordingly, it is an object of the present invention to obviate these and other prior art deficiencies. In particular, it is an object to provide a process for formation of structural boards with smoother surface or face qualities. More particularly, it is an object to provide a process for the formation of structural boards of low through medium densities by heat treating and compacting felted mats formed from thermosetting resin-treated lignocellulosic materials, especially bagasse.

These objects and others are accomplished in accordance with the present invention which contemplates the heating and initial compaction, or pressing, of felted mats formed from lignocellulosic materials impregnated or treated with thermosetting resins to compress the outer materials or fibers of the mats into dense layers forming hard, tight, smooth faces or surfaces. In the initial heating and compaction the mats are compressed at high board pressures to thicknesses of smaller dimension than that of the finally desired board thickness, without curing or heat setting the resin located away from the face of the mats. The mats are thence decompacted and expanded, and the resin cured at the thickness desired for the finished board structure.

In the initial compression, board pressures ranging from about 200 to about 600 pounds per square inch, and preferably from about 400 to about 550 pounds per square inch, are provided dependent in large measure upon the amount of moisture contained in the materials constituting, especially, the face of the mats. Preferably, mats containing from about 20 to about 40 percent fines (one-half inch on each face), providing face moisture contents ranging from about 10 to about 25 percent, and preferably from about 12 to 14 percent, are employed. At the relatively low face moisture contents, e.g., 12 to 14 percent, high pressures are generally required, whereas at relatively high face moisture contents, e.g., 20 to 25 percent, generally lower pressures will suffice. Thus, under these pressing conditions, the mats may be compressed to from about ⅛ to about ¾, or more generally from about ¼ to about ½ of the final thickness of the board, which may range generally from about one-eighth to about two inches. The greater compressions are most often necessary for proper treatment of the low density boards, and the lesser compressions are most often necessary for proper treatment of the medium density boards.

In accordance with this technique, the pressing members, i.e., the press platens, are brought downwardly upon the mats as rapidly as possible until sufficient compression at the desired board pressure is obtained. The press is then opened from the initial position at least to the final thickness desired for the finished board. The timing of the initial pressing and opening of the press is critical inasmuch as it is essential to open the press before the resin about the center of a mat has reached cure temperature. After opening the press to the thickness desired for the final board structure, the spring back of the core fibers not yet cured will produce decompaction or reexpansion of the center core fibers, or center portion of the mat, sufficient to fill the opening. After the expansion, the temperature toward the center of the mat will be elevated and the resin at the center, or on the core fibers, will cure.

In the initial pressing step the surface temperature, timing, and back-pressure are sufficient to heat cure the resin at the outer surface of a mat, while forming a hard, smooth surface; but insufficient to cure the resin located away from the outer surface. Consequently, the inner materials have not yet been bonded together so upon release of the initial pressure on partially opening the press the developed back-pressure forces expansion of the core or inner fibers or materials to fill the opening. Continued application of heat finally cures the resin and binds the total mass together to form a structural board.

An alternate technique may be most suitable in certain circumstances. In accordance therewith, following the intitial step the press is opened sufficient to allow the mat to expand to a thickness greater than the final desired thickness. The mat with its already compacted and cured surface may then be repressed to final thickness very slowly while the resin on the core fiber is being cured so that maximum internal bond strength can be obtained. This technique is advantageous in pressing boards that by their nature require slow press closures to develop high internal bond strength.

In either alternative it is advantageous to provide a rapid rate of compression in the initial compression step. The more rapid the initial compression, the faster the development of the back pressure and the more compact the faces. In practical terms, this means that presses having high ram speeds should be employed which compress and reduce the thickness of the mats at a rate of from about 2 to about 30 inches per minute, i.e., ram speeds should range from at least about 2 to about 30 inches per minute.

The following examples are illustrative of the present invention.

EXAMPLES

To prepare the felted mats from which structural boards are to be formed, whole green bagasse is processed in a hammer mill and a disc mill to provide fibers which are then sprayed with a twenty-five percent aqueous solution of phenol formaldehyde resin to impregnate or coat essentially all of the fiber with the resin. Mats are then formed using a Baehre Bison air felting machine which classifies the fibers into fine and coarse fractions. These fractions are simultaneously classified and formed into a mat such that the fines are on the outermost surface of each face, and the coarse fibers form the core of the board. Thus, this mat form gives bound coarse fractions in which the outermost layers contain the largest proportion of pith and fines. The coarse fiber fractions which form the core of the boards have about one-half as much resin as on the fines at the faces.

Mats having 20 percent fines applied as faces, and with a face furnish moisture content of 16 percent, are pressed at a platen temperature of 400° F. and at a high board pressure to form boards of one-half thickness with densities of thirty pounds per cubic foot. Ram speeds of 11.8 inches per minute are employed to close the press opening, in about 16 seconds, to an initial ⅛ inch in thickness. After 90 seconds, the press is opened to one-half inch and held for 600 more seconds until the resin of the whole mat has cured. Total cycle time thus ranges just below 12 minutes.

Initial board pressures of 450 to 475 pounds per square inch are found to provide a hard, smooth surface to the finished boards.

In forming mats for processing according to this invention, art recognized techniques are generally employed. Mats of lignocellulosic materials, especially bagasse, are formed by air classification into various fines and coarse fractions. All or a portion of the several fractions are impregnated, coated, or treated with thermosetting resins, and the materials then used in forming mats. The finer materials, generally containing higher resin concentrations, are applied to form the outer surfaces of the mat while the coarser fractions form the inner core.

Generally from about 2 to about 25 percent resin, and most often from about 6 to about 14 percent resin, is used in treating the lignocellulosic materials, or bagasse, based on the weight of dry resin to dry fiber. The fibers are treated with the resin by spraying or by admixture of solutions or dispersions of the resin with the fiber, followed by partial or complete removal of the liquid. It is necessary to partially deliquefy or dry the fiber by removing the liquid without curing the resin. This is accomplished by quick partial deliquefication or drying at a temperature below the curing temperature of the resin. The maximum temperature to be used, and time of drying, thus depends upon the nature of the resin. Generally from about 15 percent to about 50 percent, and preferably from about 20 percent to about 30 percent, resin is dispersed in a liquid, e.g., water or low boiling solvent, based on the total weight of the liquid-solids system formed.

Essentially any thermosetting resin, plastic or plastic-like substance which will bind the fibers and which, of course, can be cured or hardened, and permanently set, by application of sufficient heat can be used in this invention. Preferably, the thermosetting resin to be used is one of relatively light color, and one having a viscosity ranging from about 40 to about 1000 centipoises for a fifty percent solids solution. Illustrative of the more preferred thermosetting resins are phenol-aldehyde resins, particularly phenol-formaldehyde and urea-formaldehyde resins, whether used alone or with catalytic materials to aid in the curing.

Having discussed the invention, what is claimed is:

1. A process for forming, by pressing between rigid members, low through medium density fiber board structures of final densities ranging from about 18 pounds per cubic foot to about 45 pounds per cubic foot comprising:
   forming a mat of thermosetting, resin coated, felted, lignocellulosic fibers,
   hot pressing the mat between the rigid members to a thickness less than the final board thickness, and for such time as to cure only the surface resin of the mat without curing the resin at the core of the mat, releasing the pressure applied by the rigid members to permit back pressure forces of the core fibers to expand the mat to a greater thickness, and continued hot pressing of the mat to a desired thickness to cure the core resin and form a bonded board structure having dense hard outer surfaces.

2. The process of claim 1 wherein the mat is pressed at pressures ranging from about 200 to about 600 pounds per square inch.

3. The process of claim 2 wherein a pressure ranging from about 400 to about 550 pounds per square inch is applied.

4. The process of claim 1 wherein the final board structure is of low density ranging from about 18 to about 36 pounds per cubic foot.

5. The process of claim 1 wherein the lignocellulosic fibers are comprised of bagasse.

6. The process of claim 1 wherein the mat, upon releasing the initially applied pressure, is permitted under the stimulus of back-pressure forces to expand to the thickness of the final board thickness and the resin cured.

7. The process of claim 1 wherein the mat, upon releasing the initially applied pressure, is permitted under the stimulus of back-pressure forces to expand to a thickness greater than the final board thickness and thence recompressed between the rigid members to the final board thickness while the resin is being cured.

8. The process of claim 1 wherein the mat contains from about 20 to about 40 percent fines, while face moisture content ranges from about 10 to about 25 percent.

9. The process of claim 8 wherein the face moisture content ranges from about 12 to about 14 percent.

10. The process of claim 1 wherein the mat is reduced to its initial thickness in the initial hot pressing step at a rate ranging from about 2 to about 30 inches per minute.

11. The process of claim 1 wherein the initial hot pressing produces a mat thickness ranging from about ⅛ to about ¾ that of the finished structural board.

12. The process of claim 11 wherein the initial hot pressing produces a mat of thickness ranging from about ¼ to about ½ that of the finished structural board.

13. The process of claim 11 wherein the structural board produced ranges from about ⅛ to about 2 inches in thickness.

References Cited
UNITED STATES PATENTS

| | | | |
|---|---|---|---|
| 2,379,163 | 6/1945 | Landon | 264—120 |
| Re. 23,829 | 5/1954 | Goss | 264—120 |
| 2,964,792 | 11/1960 | Yan et al. | 264—120 |

ROBERT F. WHITE, Primary Examiner

J. R. HALL, Assistant Examiner